Dec. 13, 1932.　　F. MARASSO　　1,890,740
LOADING APPARATUS FOR PROOFERS
Filed April 22, 1932　　2 Sheets-Sheet 1
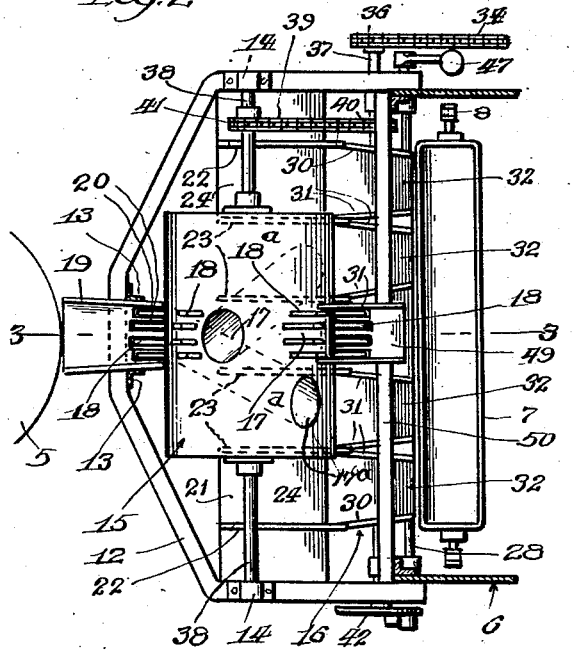
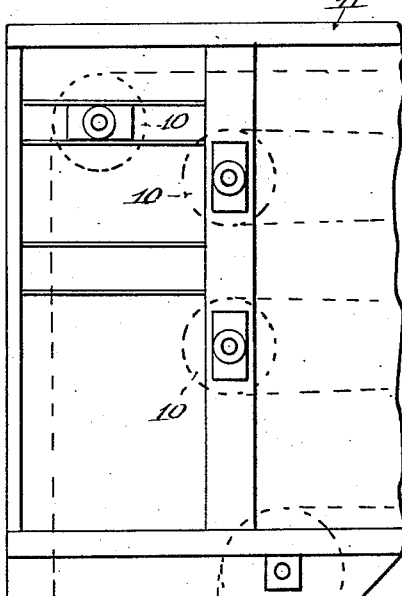
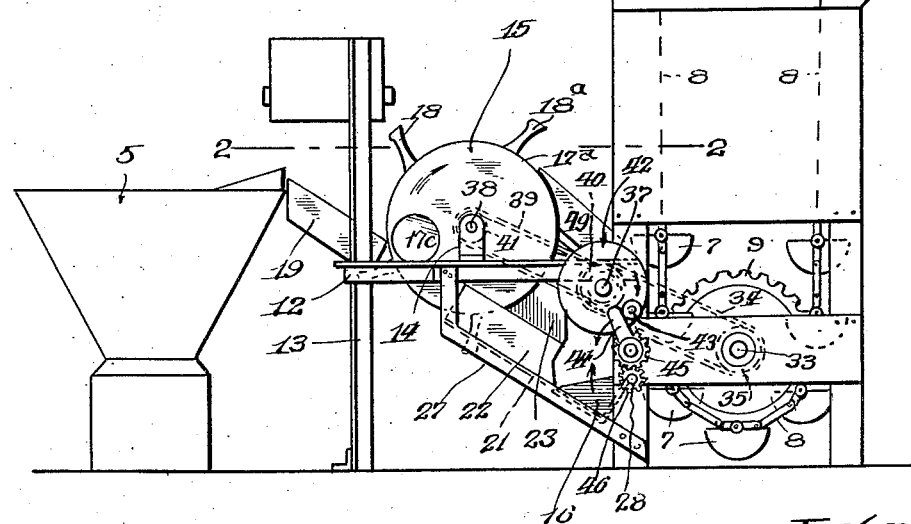
Inventor:
Fred Marasso,
by Charles O. Sturwey
his Atty.

Dec. 13, 1932. F. MARASSO 1,890,740
LOADING APPARATUS FOR PROOFERS
Filed April 22, 1932 2 Sheets-Sheet 2
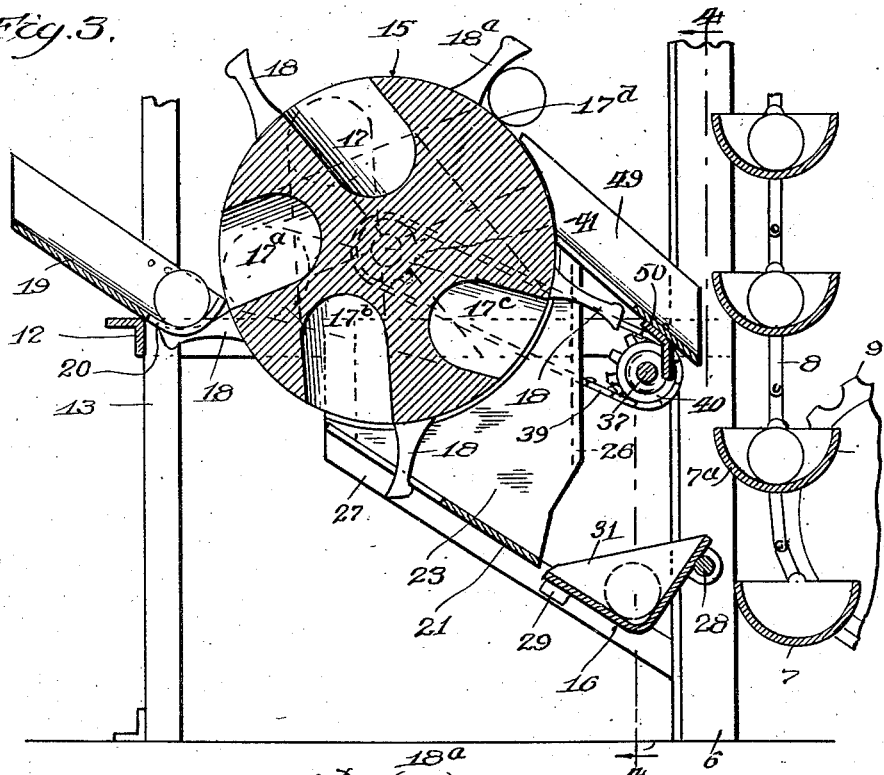
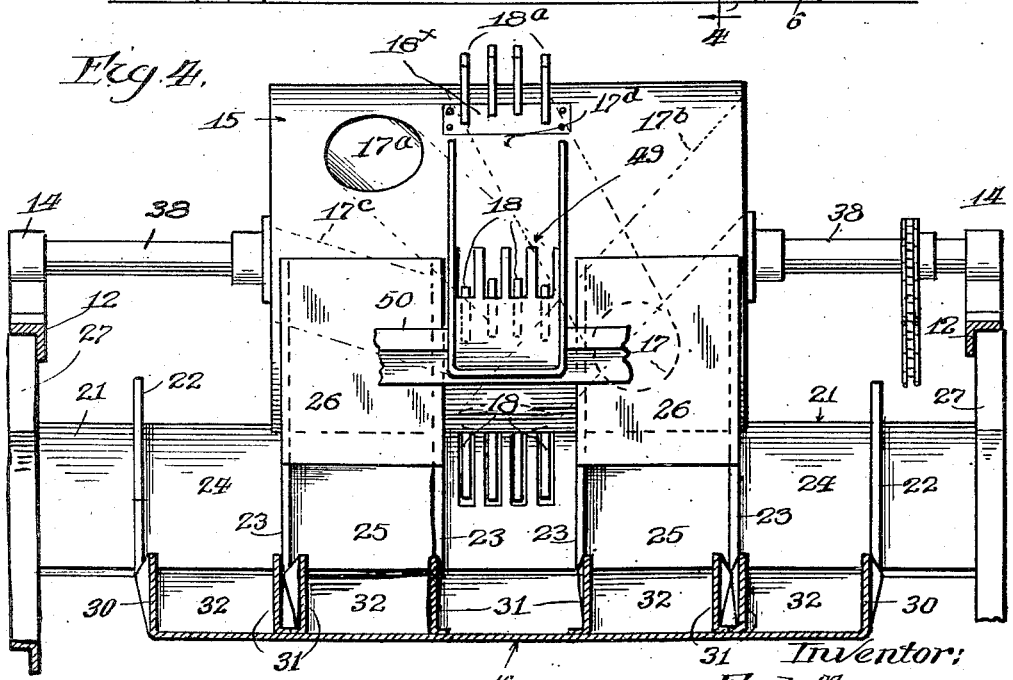

Patented Dec. 13, 1932

1,890,740

UNITED STATES PATENT OFFICE

FRED MARASSO, OF JOLIET, ILLINOIS, ASSIGNOR TO UNION MACHINERY COMPANY, OF JOLIET, ILLINOIS, A CORPORATION OF ILLINOIS

LOADING APPARATUS FOR PROOFERS

Application filed April 22, 1932. Serial No. 606,789.

This invention relates to loading apparatus for proofers, and its principal object is to provide means for loading several lumps of dough at a time into a tray of a proofer. As is well understood, many proofers employ elongated trays each adapted to contain several lumps of dough, the trays being carried by endless chains and propelled slowly through the proofing chamber, and, in many installations, a rounder is employed in advance of the proofer for rounding up the lumps of dough. The rounder and proofer are so timed with respect to each other that the rounder will round up the necessary number of lumps of dough in time to load each tray as it passes a given station, and the present mechanism has been designed to operate in conjunction with a rounder and a proofer in such manner that as the lumps of dough are discharged from the rounder they will be collected by the loading apparatus and when the required number have been collected they are deposited in the tray which has reached the loading station.

In some cases the timing is such that a greater number of lumps of dough are required to fill the tray than can be readily handled by the primary loading mechanism, and in order to overcome this difficulty the loading mechanism is provided with auxiliary means for loading an additional lump of dough into the tray so as to fill the same.

With these and other objects and advantages in view, this invention consists in the several novel features of construction, arrangement and combination of parts hereinafter fully set forth and claimed.

The invention is clearly illustrated in the drawings accompanying this specification in which Figure 1 is a side elevation of a rounder and a fragment of a proofer of ordinary construction illustrating a loading apparatus embodying a simple form of the present invention interposed between the rounder and proofer;

Fig. 2 is a view, partly in plan and partly in horizontal section, taken on the line 2—2 of Fig. 1;

Fig. 3 is a fragmental detail vertical cross section taken on the line 3—3 of Fig. 2; and Fig. 4 is a view, partly in end elevation and partly in vertical cross section taken on the line 4—4 of Fig. 3.

Referring to said drawings, the reference character 5 designates a rounder of conventional form and 6 designates a fragment of a conventional proofer spaced a short distance from the rounder, and between these two machines is interposed the loading apparatus. As is well understood, rounders round up lumps of dough usually in a rotating bowl and discharge them at the upper end thereof.

In the present loader, the lumps of dough are discharged from the rounder into a chute and are collected in the loading mechanism and finally discharged into the tray of the proofer which has reached the loading station. The trays are carried by endless chains 8 which are trained around sprocket wheels 9 and 10 and carried back and forth in a horizontal direction within the proofing chamber 11 of the proofer. At the receiving end of the proofer the chains 8 extend in a vertical direction from the loading end of the proofer to the proofing chamber 11. At some place in the bottom of the proofing chamber is a discharge opening where the trays are inverted and the lumps of dough discharged therefrom. The trays are elongated considerably in order to hold several lumps of dough. In the present instance they are of sufficient length to contain five lumps, although the size of the trays may, of course, be varied to suit any particular requirements.

In the simple form of the invention illustrated, the loading mechanism in the main is mounted upon a horizontally extending substantially U-shaped frame bar 12. The two ends of the frame bar are bolted or otherwise secured to the frame of the proofer and the middle portion of the frame bar 12 is supported by upright frame bars 13.

Journaled upon brackets 14 mounted on the frame bar 12 is a dough distributing element, here shown in the form of a drum 15, which is formed with a number of substantially cylindrical passageways 17, $17^a$, $17^b$, and $17^c$ extending obliquely therethrough through which the lumps of dough are conveyed to and distributed in spaced relation upon a loading shelf 16, where they are collected and from which they are discharged, as will be hereinafter more fully described. The inlet openings to said passageways are located in a common vertical plane midway between the ends of the drum and the passageways extend in oblique directions to the right and to the left through the drum, so that the discharge ends of said passageways are disposed in separate vertical planes, whereby to discharge the lumps of dough from the drum into several spaced places leading to spaced places on the loading shelf. Certain of the passageways discharge through the cylindrical face of the drum and others discharge through the end faces thereof.

In the form of the invention illustrated, there are four passageways through the drum, the inlets of which are disposed seventy-two degrees apart around the surface of the drum which leaves a solid place 17$^d$ between two of the inlet openings. The face of the drum intermediate the two widely spaced inlet openings is left solid to permit the loading apparatus to fill each tray with five lumps of dough, four of which pass through the oblique passageways in the drum and one of which is carried on the face thereof to a position for discharge into a partly filled tray.

Immediately behind the inlet openings of the passageways are fingers 18 and at the solid space 17$^d$ on the drum are fingers 18$^a$, which fingers pick up the lumps of dough as they are delivered to the drum, the fingers 18 carrying the lumps upward to a position where they fall by gravity through the passageways in the drum, and the fingers 18$^a$ carrying the lump of dough to a position where it rolls from the face thereof to a partly filled tray. The fingers are arranged in groups, as seen in Fig. 2, and are slightly spaced apart.

Leading from the discharge end of the rounder 5 to the cylindrical face of the drum is an inclined chute 19 through which the lumps of dough are conveyed from the rounder to the drum. At the lower end the chute is formed with lengthwise extending slots 20 (see Fig. 2) through which the fingers 18 and 18$^a$ may pass. The lower slotted end of the chute 19 is desirably bent upward, as is seen in Fig. 3, so as to retain a lump of dough until a group of fingers encounter the lump and can carry it away from the chute.

Supported below the drum is an inclined table or platform 21 upon which the drum delivers the lumps of dough that fall through the passageways in the drum, and extending up from said inclined table are end and division walls 22 and 23 which divide the inclined table into four guideways 24 and 25 that guide the lumps of dough to the loading shelf 16. The division walls 23 for each guideway 25 are connected by upright cross walls 26 which terminate some distance above the inclined table 21 to provide openings for the lumps of dough to discharge from the inclined table to the loading shelf.

The inclined table 21 is supported by inclined supporting bars 27 disposed at the sides of the loading apparatus and bolted or otherwise secured to the frame bar 12 thereof and to the uprights of the proofer. The loading shelf 16 is provided with means for discharging the collected lumps of dough therefrom, and as shown the shelf is rigidly mounted upon a rock shaft 28 journaled in the side frames of the proofer and is arranged to be swung upward into position for dumping the lumps of dough into that tray 7 which is in position to receive the lumps of dough therefrom. The drawings illustrate the parts in the position where the loading shelf is about to be tilted to discharge the lumps of dough into the adjacent tray.

A stop 29 carried by any stationary portion of the framework is arranged to limit the downward swing of the loading shelf and thereby hold it in position to receive lumps of dough from the inclined table 21. Desirably the bottom of the loading shell is of V or channel shape in cross section, as is clearly illustrated in Fig. 3, so that when the loading shelf is swung upward the lumps of dough may gravitate from the loading shelf into the tray. The loading shelf is divided by end walls 30 and partitions 31 into several separate pockets 32, and said walls 30 and partitions 31 for each chute 32 converge towards each other, as seen in Fig. 2, whereby to deliver the lumps of dough into spaced relation in the tray. Four pockets 32 are illustrated, there being groups of two each, disposed beyond the middle of the drum and adapted to deliver two lumps of dough near each end of the tray with a sufficient space between the two groups to receive a lump between them.

The drum 15 is rotated in timed relation to the movement of the endless chain 8 which carries the trays, one complete rotation of the drum 15 taking place during the time that a tray travels a distance equal to the distance between two trays from center to center. Conveniently, the drum may be driven from the shaft 33 of the proofer, as, for instance, by a sprocket chain 34 trained around the sprocket wheel 35 on the shaft 33 and a sprocket wheel 36 on a counter shaft 37, the latter shaft and the shaft 38 of the drum being connected by a sprocket chain 39 trained over sprocket wheels 40 and 41 mounted on the counter shaft and drum respectively.

Any suitable driving mechanism may be employed for tilting the loading shelf 16, and, as shown, the counter shaft 37 has secured upon one end a disk wheel 42 upon which is mounted a roller 43 that is adapted to encounter an arm 44 carried by a gear wheel 45 which meshes with a pinion 46 fast on one end of the rock shaft 28 which carries the loading shelf. The gear wheel 45 is mounted upon a stub shaft secured to and projecting out from the side of the proofer frame.

The arrangement of the parts is such that during each complete revolution of the disk wheel 42, and, consequently, during each revolution of the drum 15, the roller 45 encounters the arm 44 and swings the same through an arc of sufficient extent to cause the loading shelf to be swung upwardly into tilting position through the gear and pinion connections 45 and 46. A counterweight 47 upon the other end of the shaft 28 serves to counterbalance the loading shelf 16. When the arm 44 is released from the roller 43, the weight of the loading shelf swings it down into loading position.

Located above the loading mechanism is means for conveying to the trays lumps of dough which are carried up by the fingers 18ª that are located at the solid place 17ᵈ on the drum. As shown, this conveying means comprises an inclined chute 49 supported by a bar 50 carried by the framework of the machine, and said chute extends from the face of the drum to a position adjacent the path of travel of the trays whereby a lump of dough rolling down said chute will discharge into the tray next below the chute. The upper portion of the bottom of the chute is formed with lengthwise extending slots to permit the fingers 18 and 18ª to pass through the chute.

In the operation of the loader, the lumps of dough are discharged from the rounder one at a time and fall upon the receiving chute 19 and roll to the lower end thereof. In the cycle of operation for each tray the group of fingers 18 associated with the passageway 17 are the first to pick up the lump of dough which has rolled to the lower end of the receiving chute 19, the fingers for the passageway 17ª pick up the next lump and so on, and in each case when the drum has been rotated sufficiently to bring an oblique passageway into a steep enough incline, the lump of dough gravitates through said passageway and discharges upon the inclined table 21 from which it rolls into one of the pockets 32 of the loading shelf.

The passageways being directed to the chutes 24 and 25 of the inclined table the four lumps of dough entering said chutes will find their way into the two spaced groups of pockets carried by the loading shelf. The fifth group of fingers 18ª picks up a lump of dough from the receiving chute 19 and carries the same upward on the cylindrical face of the drum until the lump gravitates down the chute 49. However, directly after the fourth lump of dough has been delivered to the loading shelf, the roller 43 engages the arm 44 and through the gears 45 and 46 tilts the loading shelf upward, thereby discharging the four lumps of dough, therefrom into the tray, numbered 7 in Fig. 3, which now occupies a position to receive the same.

The trays are continuously moving and when the tray numbered 7 reaches a position slightly above that occupied by the tray numbered 7ª the lump carried on the cylindrical face of the drum reaches a position where it rolls through the chute 49 and into the unoccupied space at the tray 7ª between the lumps which have been previously deposited therein by the loading shelf. At the same time the roller 43 has passed the arm 44 thereby permitting the loading shelf to drop to its loading position. The lump of dough which was carried up by the fingers 18 for the passageway 17 following the solid space 17ᵈ on the drum rolls down the passageway and falls into one of the pockets of the loading tray. This operation is continued indefinitely.

It will be observed, therefore, that the trays are partly filled with lumps of dough that pass through the passageways in the drum and are transferred to the trays by the loading shelf, and whenever it is desired to load the trays with more lumps of dough than can be handled by the drum in this manner, the auxiliary loading mechanism is employed which conveys the lumps of dough from the face of the drum to the trays and deposits them therein between the lumps of dough already loaded into the tray by the loading shelf.

To adapt the drum for loading a lesser number of lumps of dough into the tray, the fingers 18 and 18ª may be removably mounted on the drum, as, for instance, by fastening them to a plate 18ˣ which is removably secured to the drum by screws or the like.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. Loading apparatus for proofers comprising in combination a rotary distributing element having passageways all extending obliquely therethrough and containing inlet openings disposed in a common plane and discharge openings disposed in separate individual planes, means for conveying lumps of dough to the inlet openings of said passageways, a loading shelf into which the lumps of dough are delivered in spaced relation from said distributing element, and means for simultaneously discharging said lumps of dough from the loading shelf into an elongated tray.

2. Loading apparatus for proofers comprising in combination a rotary distributing element having passageways extending therethrough and containing inlet openings disposed in a common plane and discharge openings disposed in separate individual planes, a receiving chute through which lumps of dough are delivered to the inlet openings of said passageways, an inclined table upon which lumps of dough are delivered from said distributing element in spaced relation, a loading shelf into which the lumps of dough are delivered in spaced relation from said inclined table, and means for simultaneously discharging said lumps of dough from the loading shelf into an elongated tray.

3. Loading apparatus for proofers comprising in combination a rotary distributing element having passageways all extending obliquely therethrough and containing inlet openings disposed in a common plane, and discharge openings disposed in separate individual planes, a receiving chute through which lumps of dough are delivered to the inlet openings of said passageways, an inclined table upon which lumps of dough are delivered from said distributing element in spaced relation, division walls extending up from said inclined table and dividing the same into separate chutes, a loading shelf into which the lumps of dough are delivered in spaced relation from said separate chutes, and means for simultaneously discharging said lumps of dough from the loading shelf into an elongated tray.

4. Loading apparatus for proofers comprising in combination a rotary distributing element having passageways extending therethrough and containing inlet openings disposed in a common plane and discharge openings disposed in separate individual planes, a receiving chute through which lumps of dough are delivered to the inlet openings of said passageways, an oscillatory loading shelf into which the lumps of dough are delivered in spaced relation from said distributing element, and means operating in timed relation to said distributing element for tilting said loading shelf once during each revolution of the distributing element and simultaneously discharging the collected lumps of dough into an elongated tray.

5. Loading apparatus for proofers comprising in combination a rotary drum having obliquely extending passageways therein of which the inlet openings are disposed in a common plane and the discharge openings disposed in separate spaced planes, fingers extending from the cylindrical face of the drum adjacent said inlet openings, a receiving chute through which lumps of dough are delivered into position to be picked up by said fingers, a tiltable loading shelf into which lumps of dough are delivered from said drum in spaced relation, and means operating in timed relation to said drum for tilting said loading shelf to simultaneously discharge the lumps of dough therefrom into an elongated tray.

6. Loading apparatus for proofers comprising in combination a rotary drum having obliquely extending passageways therein of which the inlet openings are disposed in a common plane and the discharge openings disposed in separate spaced planes, fingers extending from the cylindrical face of the drum adjacent said inlet openings, a receiving chute through which lumps of dough are delivered into position to be picked up by said fingers, a tiltable loading shelf having spaced pockets therein into which lumps of dough are delivered from said drum in spaced relation, and means operating in timed relation to the drum for tilting said loading shelf to simultaneously discharge the lumps of dough into an elongated tray.

7. Loading apparatus for proofers of the type employing elongated traveling trays comprising in combination a rotary drum moving in timed relation to said traveling trays, said drum having obliquely extending passageways therethrough of which the inlet openings are disposed in a common plane and the discharge openings in separate spaced planes, some at the circumference of the drum and some at the sides thereof, means for delivering lumps of dough to the inlet openings of said passageways, a tiltable loading shelf into which the lumps of dough are discharged from said passageways in spaced position, and shelf tilting mechanism operating in timed relation to said drum to tilt said loading shelf and simultaneously discharge the collected lumps of dough into an adjacent tray of the proofer.

8. Loading apparatus for proofers comprising in combination a rotary drum having groups of fingers extending from the cylindrical face thereof at equidistant places about the circumference, there being passageways associated with certain of said groups of fingers extending obliquely through the drum of which the inlet openings are disposed in a common plane and the discharge openings disposed in separate spaced planes, and there being one more group of fingers than passageways, means for delivering lumps of dough in position to be picked up by said fingers, a tiltable loading shelf upon which the lumps of dough are discharged from said passageways of the drum, means operating in timed relation to the drum for tilting said loading shelf once during each revolution of the drum and thereby discharging said lumps of dough into an elongated tray, and dough conveying means extending from the cylindrical face of the drum for conveying the lumps of dough which are carried by the group of fingers which is unaccompanied by a passageway, said dough conveying means discharging lumps of dough into partly filled trays.

9. Loading apparatus for proofers comprising in combination a rotary drum having groups of fingers extending from the cylindrical face thereof at equi-distant places about the circumference, there being passageways associated with certain groups of fingers extending obliquely through the drum of which the inlet openings are disposed in a common plane and the discharge openings disposed in separate planes, and there being one more group of fingers than passageways, means for delivering lumps of dough in position to be picked up by said fingers, a tiltable loading shelf upon which lumps of dough are discharged from said passageways of the drum, means operated in timed relation to the drum for tilting said shelf once during each revolution of the drum thereby discharging said lumps of dough into an elongated tray, and an inclined delivery chute extending from the cylindrical face of the drum into which are distributed the lumps of dough which are conveyed by the group of fingers which is unaccompanied by passageways, said delivery chute discharging a lump of dough into a partly filled tray.

10. Loading apparatus for proofers comprising in combination a rotary drum having groups of fingers extending from the cylindrical face thereof at equi-distant points above the circumference, there being passageways associated with certain groups of fingers extending obliquely through the drum of which the inlet openings are disposed in a common plane and the discharge openings disposed in separate spaced planes, certain of said discharge openings being on the circumference of the drum and certain at the sides thereof, there being one more group of fingers than passageways whereby a solid place is provided on the face of the drum adjacent one group of fingers, means for delivering lumps of dough in position to be picked up by said fingers, a tiltable loading shelf upon which lumps of dough are discharged from said passageways of the drum, means operating in timed relation to the drum for tilting said shelf once during each revolution of the drum thereby discharging said lumps of dough into an elongated tray, and an inclined delivery chute extending from the cylindrical face of the drum into which are deposited lumps of dough carried by the fingers adjacent said solid space on the face of the drum, said delivery chute discharging a lump of dough into a partly filled tray.

11. Loading apparatus for proofers comprising in combination a rotary drum having groups of fingers extending from the cylindrical face of the drum at equi-distant points from the circumference thereof, there being oblique passageways associated with all but one group of said groups of fingers extending through the drum, of which passageways the inlet openings are disposed in a common plane and the discharge openings disposed in separate planes, certain of which are on the circumference of the drum and others at the ends thereof, means for transferring lumps of dough delivered through said passageways to an elongated tray, and thereby partly filling said tray and other means for delivering lumps of dough carried by the groups of fingers unaccompanied by a passageway to the unfilled portion of the tray.

12. In loading apparatus for proofers a rotary distributing drum having substantially cylindrical passageways all extending obliquely therethrough of which the inlet openings are disposed in a common plane and the discharge openings are disposed in separated individual planes.

13. In loading apparatus a distributing drum having substantially cylindrical passageways all extending obliquely therethrough of which the inlet openings are disposed in a common plane midway between the ends of the drum and certain of the outlet openings are disposed in the periphery of the drum and other outlet openings at the sides of the drum.

14. In loading apparatus the combination of a distributing drum having obliquely extending passageways therethrough, a tiltable loading shelf into which lumps of dough are discharged from the drum, and shelf tilting mechanism operating in timed relation to the movement of the drum.

15. In loading apparatus for proofers the combination of a distributing drum, a tiltable loading shelf for transferring lumps of dough from the drum to an elongated tray, shelf tilting mechanism operating in timed relation to the drum, and an auxiliary distributing chute co-operating with the drum to deliver lumps of dough into an elongated tray which is partly filled with lumps of dough deposited therein by the loading shelf.

FRED MARASSO.